March 14, 1933.                L. L. GRAHAM                1,901,292
                        BRAKE THROW MEASURING DEVICE
                            Filed July 9, 1928
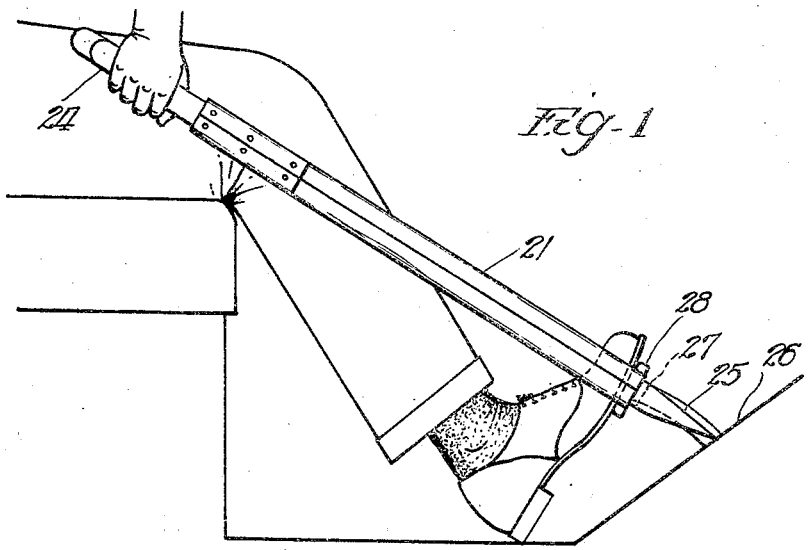
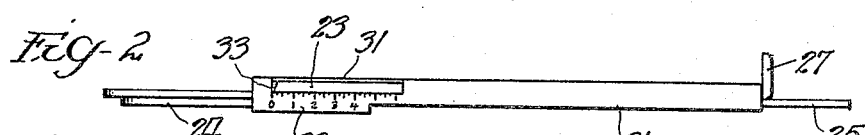
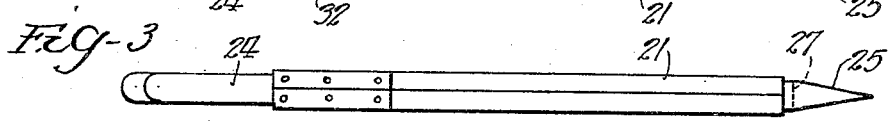
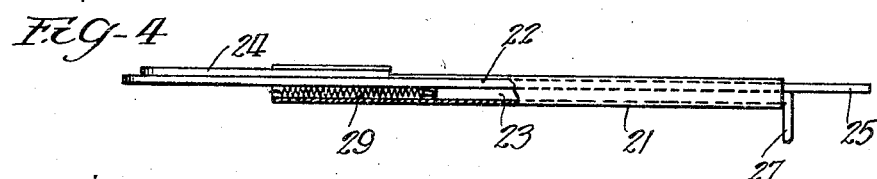
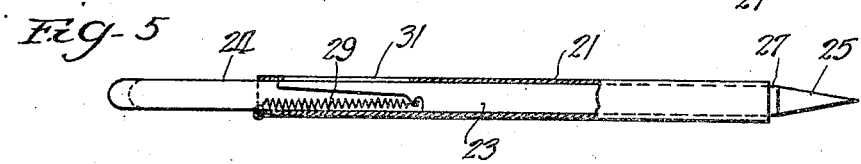
INVENTOR.
Leon L. Graham
BY Carl S. Lloyd
ATTORNEY.

Patented Mar. 14, 1933

1,901,292

UNITED STATES PATENT OFFICE

LEON L. GRAHAM, OF CHICAGO, ILLINOIS, ASSIGNOR TO BENDIX-COWDREY BRAKE TESTER, INC., OF SOUTH BEND, INDIANA, A CORPORATION OF DELAWARE

BRAKE THROW MEASURING DEVICE

Application filed July 9, 1928. Serial No. 291,468.

The object of my invention is to provide a device for measuring the throw or extent of movement on the operative stroke of an automobile brake pedal or the like, the particular use contemplated for the device being in connection with the testing of automobile brakes by machines which are used to rotate the wheels of the automobile and serve to indicate the amount of resistance when the brakes are applied. By means of my invention, the brake pressure may be definitely related to the extent of application of the brakes, as shown by the movement of the brake pedal.

Other objects and advantages of the invention will be apparent as it is better understood from the following description, which, taken in connection with the accompanying drawing, discloses a preferred embodiment thereof.

Referring to the drawing,

Fig. 1 is an elevational view of a device in which my invention is embodied, illustrating the use thereof;

Fig. 2 is a plan view of the device;

Fig. 3 is a side view;

Fig. 4 is a bottom plan view, a part of the casing being broken away in this view for convenience in illustration; and Fig. 5 is a side view taken from the side opposite that shown in Fig. 3, part of the casing being also broken away for clearness in this view.

Upon said drawing, illustrating the best manner in which I have thus far contemplated applying the principles of my invention, the reference character 21 indicates a casing in which there are mounted two relatively movable bars 22 and 23, the latter being movable and the former having a handhold 24 thereon and a lower end part 25 adapted to rest on the floor 26 of the car, this end part being preferably pointed to prevent slippage on the floor board. Said bar 22 and the casing 21 form a unit which serves as a brace or support whereby the device may be held in position adjacent the brake pedal as will later appear. The casing 21 is attached to the members 24 and 22 by means of screws or rivets as shown in Fig. 3.

The bar 23 has a right angle lower end part 27, which is adapted to be arranged beneath the brake pedal 28 of the car and the upper end of said member 23 is connected by a spring 29 with the casing 21, said spring tending to draw said member 23 upwardly and to resist the downward movement thereof produced by the brake pedal acting against the laterally turned portion, or foot member 27, the latter being disposed outside the casing 21 and being adapted in the up position to engage the lower end of said casing, thereby determining the normal, or zero, position of said bar 23. The casing has an opening, or slot, 31 in the upper part thereof, and adjacent said opening, the exterior of the casing is graduated, as indicated at 32 in Fig. 2. The bar 23 may be seen through this opening and is adapted to have an indicator point, as shown at 33, which is normally disposed at the zero point of the indicator.

With the device applied as shown in Fig. 1 and with the fixed parts 21, 22 thereof serving as a brace, the bar 23 will be moved downwardly when the brake pedal is depressed, thus causing the indicator point 33 on said bar to indicate the extent of the brake throw, the indicator being preferably graduated in inches so that the brake resistance produced by application of the brake may be related to the number of inches that the brake pedal is depressed. If the proper ratio is not found to exist, adjustment may be made so that the brake throw will bear a predetermined relation to the action of the brakes.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A device for measuring the throw of an automobile brake pedal or the like comprising a brace bar arrangeable alongside the pedal with one end engaging the floor of the automobile, a movable member carried by said brace bar and having a part engageable by the underside of the pedal whereby said member may be moved correspondingly to the pedal throw, said brace bar having graduations thereon to show the extent of movement of said member caused by depression of the pedal, and means affording a yielding connection between said brace bar and said movable member.

2. A device for measuring the throw of an automobile brake pedal or the like comprising a brace bar arrangeable alongside the pedal with one end engaging the floor of the automobile, a movable member carried by said brace bar and having a part engageable by the underside of the pedal whereby said member may be moved correspondingly to the pedal throw, said brace bar having graduations thereon to show the extent of movement of said member caused by depression of the pedal, and a spring between said brace bar and said movable member tending to draw said member toward normal or zero position.

3. A device for measuring the throw of an automobile brake pedal or the like comprising two adjacent relatively movable bars, one having a hand-hold and a part adapted to rest on the floor of the automobile and the other having thereon a member adapted to be engaged and moved in the operation of the pedal, one of said bars having a pointer and the other bar having graduations thereon for indicating the amount of relative movement between said bars caused by depression of the pedal, and means yielding connecting said bars.

4. A device for measuring the throw of an automobile brake pedal or the like comprising two adjacent relatively movable bars, one having a hand-hold and a part adapted to rest on the floor of the automobile and the other having thereon a member adapted to be engaged and moved in the operation of the pedal, one of said bars having a pointer and the other bar having graduations thereon for indicating the amount of relative movement between said bars, and a return-spring connecting said bars.

5. A device for measuring the throw of an automobile brake pedal or the like comprising two adjacent relatively movable bars, one having a hand-hold and a part adapted to rest on the floor of the automobile and the other having thereon a member adapted to be moved in the operation of the pedal, means yieldingly connecting said bars and a casing in which said bars are enclosed, said casing having an opening therein and having graduations adjacent said opening and said last-mentioned bar having an indicator point thereon, the movement of which may be observed through said opening with reference to said graduations.

In witness whereof, I hereunto subscribe my name to this specification.

LEON L. GRAHAM.